US008798379B2

(12) United States Patent
Arai

(10) Patent No.: US 8,798,379 B2
(45) Date of Patent: Aug. 5, 2014

(54) IMAGE PROCESSING METHOD, ENCODING DEVICE, DECODING DEVICE, AND IMAGE PROCESSING APPARATUS

(75) Inventor: Hiroshi Arai, Kanagawa (JP)

(73) Assignee: Sony Corporation, Tokyo (JP)

( * ) Notice: Subject to any disclaimer, the term of this patent is extended or adjusted under 35 U.S.C. 154(b) by 75 days.

(21) Appl. No.: 13/552,285

(22) Filed: Jul. 18, 2012

(65) Prior Publication Data

US 2013/0028528 A1 Jan. 31, 2013

(30) Foreign Application Priority Data

Jul. 25, 2011 (JP) ................................. 2011-161791

(51) Int. Cl.
*G06K 9/36* (2006.01)
*H04N 5/783* (2006.01)
*H04N 7/26* (2006.01)
*H04N 7/30* (2006.01)

(52) U.S. Cl.
CPC ................. *H04N 5/783* (2013.01); *H04N 7/26* (2013.01); *H04N 7/30* (2013.01)
USPC ............................ 382/232; 382/233; 382/236

(58) Field of Classification Search
CPC ....... H04N 7/50; H04N 7/30; H04N 7/26244; H04N 7/26313; H04N 7/26106; H04N 7/26335; H04N 7/26765; H04N 7/361; H04N 7/462; G06T 3/4038; G06T 11/60; G06T 5/50

USPC ............. 382/232, 233, 236, 284; 375/240.26, 375/240.12; 704/504; 348/423.1, 484
See application file for complete search history.

(56) References Cited

U.S. PATENT DOCUMENTS 6,526,385 B1 * 2/2003 Kobayashi et al. ........... 704/504
6,680,976 B1 * 1/2004 Chen et al. ............... 375/240.26

FOREIGN PATENT DOCUMENTS

JP 2010-278481 12/2010

* cited by examiner

*Primary Examiner* — Anh Do
(74) *Attorney, Agent, or Firm* — Sony Corporation

(57) ABSTRACT

There is provided an image processing method includes: separating an image taken at a predetermined frame rate into a first frame and at least one second frame other than the first frame at intervals of 1/n, where n is an integer of 2 or larger; calculating a low-frequency-component difference between the separated at least one second frame and first frame; performing signal processing designated by a user on the first frame; decompressing, using a low-frequency component in the first frame being subjected to the signal processing and the low-frequency-component difference, a low-frequency component in the at least one second frame being approximately subjected to the signal processing; and decompressing, using the decompressed low-frequency component in the at least one second frame and a high-frequency component therein, the at least one second frame being approximately subjected to the signal processing.

12 Claims, 14 Drawing Sheets

FIG.10
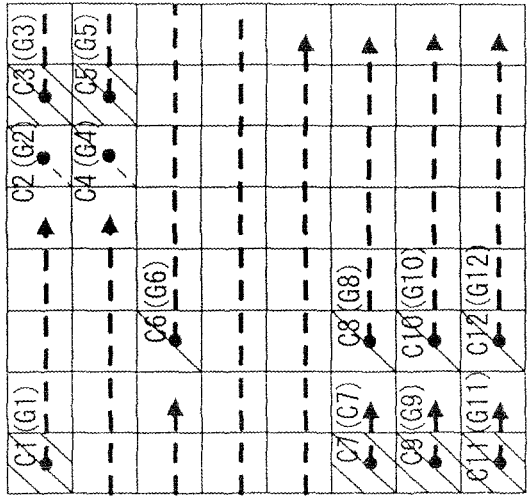
Extraction of characteristic points by horizontal scanning
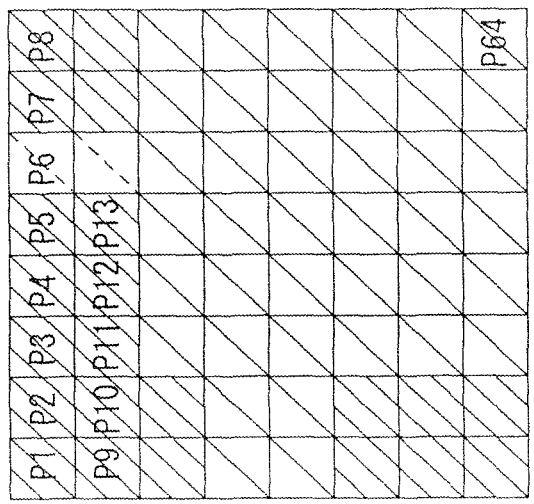
Two-dimensional image FIG.12
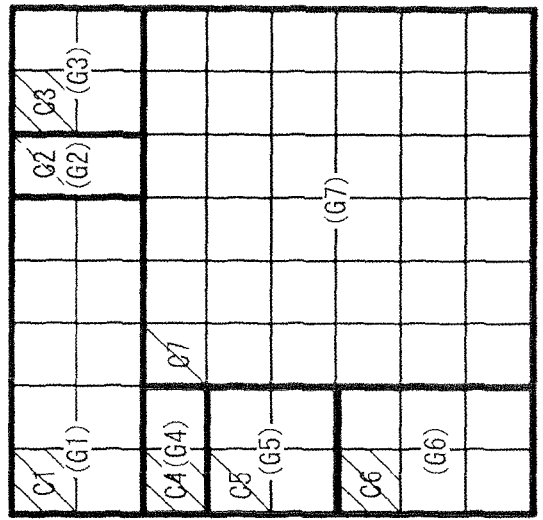
Extraction of characteristic points by extraction of rectangular regions
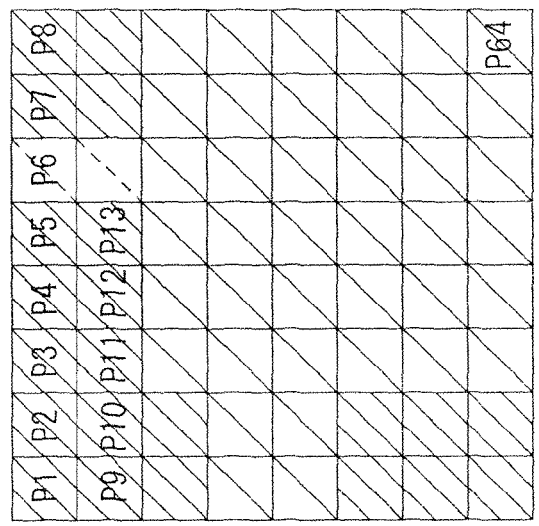
Two-dimensional image

IMAGE PROCESSING METHOD, ENCODING DEVICE, DECODING DEVICE, AND IMAGE PROCESSING APPARATUS

BACKGROUND

The present technology relates to an image processing method, an encoding device, a decoding device, and an image processing apparatus suitable for processing of high-speed images taken by a high-speed camera, for example.

In order to achieve reproduction of images in slow motion, a high-speed camera has recently appeared in the market, which is capable of imaging at a high frame rate of several hundreds to several thousands of frames per second, which is much higher than the frame rate of an ordinary camera (24 or 30 frames per second).

As an example, Japanese Patent Application Laid-open No. 2010-278481 (hereinafter, referred to as Patent Document 1) describes the technology about a data processing apparatus that is capable of capturing high-speed video taken by a high-speed camera, performing signal processing thereon, and reproducing the video in slow motion. The data processing apparatus of Patent Document 1 divides the high-speed video taken by the high-speed camera on an n-frame basis, and stores the resulting frames into a data storage means. The data processing apparatus reads the frames from the data storage means, compresses and encodes the frames, and records the frames onto the data storage means as stream data. The stream data recorded on the data storage means is decoded by a decoding means in the data processing apparatus, and then is supplied to a display device for display thereon. With the data processing apparatus of Patent Document 1 as such, described is the effect of not using a high-performance processing means because a camera output signal is processed on the independent frame basis unlike the case of performing a series of processes on a directly-received camera output signal.

SUMMARY

Data of images taken by a high-speed camera (hereinafter, referred to as "high-speed image data") is huge in amount. Therefore, if this high-speed image data is subjected to general signal processing as image processing, the total operational complexity for the signal processing is also considerably increased. Although the recent processing unit such as CPU (Central Processing Unit) is indeed remarkably increased in processing speed, performing image processing on high-speed images at a high frame rate of several hundreds to several thousands of frames per second with time restrictions results in the inevitable increase of hardware resources for use.

In view of the circumstances as described above, it is thus desirable to provide an image processing method, an encoding device, a decoding device, and an image processing apparatus with which the size of hardware for signal processing use is reduced, and the efficiency of image transmission is improved.

According to an embodiment of the present technology, there is provided an information processing method including: separating an image taken at a predetermined frame rate into a first frame and at least one second frame other than the first frame at intervals of 1/n, where n is an integer of 2 or larger; calculating a low-frequency-component difference between the separated at least one second frame and first frame; performing signal processing designated by a user on the first frame; decompressing, using a low-frequency component in the first frame being subjected to the signal processing and the low-frequency-component difference, a low-frequency component in the at least one second frame being approximately subjected to the signal processing; and decompressing, using the decompressed low-frequency component in the at least one second frame and a high-frequency component therein, the at least one second frame being approximately subjected to the signal processing.

With the information processing method as such, only by performing signal processing on the first frame, images to be reproduced are approximately subjected to the signal processing in their entirety. This accordingly reduces the size of the signal processing section, and also reduces the power consumption. Also with the image processing method, the transmission amount of codes of the second frames is reduced, thereby improving the efficiency of image transmission.

The information processing method may further include performing the signal processing on a pixel in the at least one second frame, the pixel having the low-frequency-component difference of a threshold value or more from the first frame before the signal processing. This accordingly improves the quality of signal processing performed on the second frame so that the image quality at the time of successive reproduction of the first and second frames is expected to be increased.

The information processing method may further include decompressing the at least one second frame being approximately subjected to the signal processing by analyzing a frequency component at least in the separated at least one second frame to extract a pixel being a characteristics point, by performing the signal processing on the pixel, and by generating an interpolation value based on a signal processing result for replacement of a value of a pixel not being the characteristic point. As such, the pixels specifically in the second frame are not expected to be entirely subjected to signal processing, and even in this case, the resulting image is substantially the same as that with signal processing performed on the frame in its entirety. The signal processing to the second frame is thus performed better, and the image quality at the time of successive reproduction of the first and second frames is thus expected to be increased.

According to another embodiment of the present technology, there is provided an encoding device including a frame separation section, a first frequency division section, a difference generation section, a compression and encoding section, a first signal processing section, and a transmission section. The frame separation section is configured to separate an image taken at a predetermined frame rate into a first frame and at least one second frame other than the first frame at intervals of 1/n, where n is an integer of 2 or larger. The first frequency division section is configured to divide each of the separated first frame and at least one second frame into a low frequency component and a high frequency component. The difference generation section is configured to generate difference data in low-frequency component between the at least one second frame and the first frame. The compression and encoding section is configured to compress and encode the difference data and the high-frequency component in the at least one second frame. The first signal processing section is configured to perform signal processing designated by a user on the separated first frame. The transmission section is configured to transmit the difference data and the high-frequency component in the at least one second frame that have been compressed and encoded, and the first frame having been subjected to the signal processing.

According to still another embodiment of the present technology, there is provided a decoding device for decoding information transmitted by an encoding device including a frame separation section configured to separate an image taken at a predetermined frame rate into a first frame and at least one second frame other than the first frame at intervals of 1/n, where n is an integer of 2 or larger, a first frequency division section configured to divide each of the separated first frame and at least one second flame into a low frequency component and a high frequency component, a difference generation section configured to generate difference data in low-frequency component between the at least one second frame and the first frame, a compression and encoding section configured to compress and encode the difference data and the high-frequency component in the at least one second frame, a first signal processing section configured to perform signal processing designated by a user on the separated first frame, and a transmission section configured to transmit the difference data and the high-frequency component in the at least one second frame both being compressed and encoded, and the first frame being subjected to the signal processing, the decoding device including: a separation section configured to separate the information transmitted by the encoding device into compression codes of the difference data, compression codes of the high-frequency component in the at least one second frame, and the first frame being subjected to the signal processing; an expansion section configured to expand the compression codes each in the separated difference data and in the separated high-frequency component in the at least one second frame; a low-frequency component decompression section configured to decompress, using the expanded difference data and the low-frequency component in the first frame being subjected to the signal processing, the low-frequency component in the at least one second frame being approximately subjected to the signal processing; and a frame decompression section configured to decompress, by an inverse operation of a frequency division, the at least one second frame being approximately subjected to the signal processing, using the decompressed low-frequency component in the at least one second frame and the expanded high-frequency component in the at least one second frame.

According to still another embodiment of the present technology, there is provided an image processing method including: separating an image taken at a predetermined frame rate into a first frame and at least one second frame other than the first frame at intervals of 1/n, where n is an integer of 2 or larger; performing signal processing designated by a user on the separated first frame; and performing the signal processing on a pixel detected to have a difference of a threshold value or more by a pixel-to-pixel comparison made between the separated at least one second frame and the first frame before the signal processing, and decompressing the at least one second frame being approximately subjected to the signal processing by providing a pixel not detected to have the difference of a threshold value or more with a value of a pixel at the same position in the first frame being subjected to the signal processing. With such an image processing method, the signal processing section is reduced in size, and the power consumption is also reduced.

According to still another embodiment of the present technology, there is provided an image processing apparatus including a frame separation section, a first signal processing section, a comparison section, a third signal processing section, a copy processing section, and a combining section. The frame separation section is configured to separate an image taken at a predetermined frame rate into a first frame and at least one second frame other than the first frame at intervals of 1/n, where n is an integer of 2 or larger. The first signal processing section is configured to perform signal processing designated by a user on the separated first frame. The comparison section is configured to make a pixel-to-pixel comparison between the separated at least one second frame and the first frame before the signal processing. The third signal processing section is configured to perform the signal processing on a pixel detected to have a difference of a threshold value or more. The copy processing section is configured to provide a pixel not detected to have the difference of a threshold value or more with a value of a pixel at the same position in the first frame having been subjected to the signal processing. The combining section is configured to combine an output from the third signal processing section and an output from the copy processing section to decompress the at least one second frame having been approximately subjected to the signal processing.

As described above, according to the present technology, the hardware size for signal processing is reduced, and the efficiency of image transmission is improved.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 10 is a diagram illustrating a method of extracting characteristic points by image scanning in the horizontal direction;

FIG. 12 is a diagram illustrating a method of extracting characteristic points by wavelet transform;

DETAILED DESCRIPTION OF EMBODIMENTS

Hereinafter, embodiments of the present technology will be described with reference to the drawings.

The embodiments are about an image processing method, an encoding device, a decoding device, and an image processing apparatus that are suitable for signal processing of high-speed image data.

[About High-Speed Image Data]

First of all, described is the high-speed image data.

Figure 1:
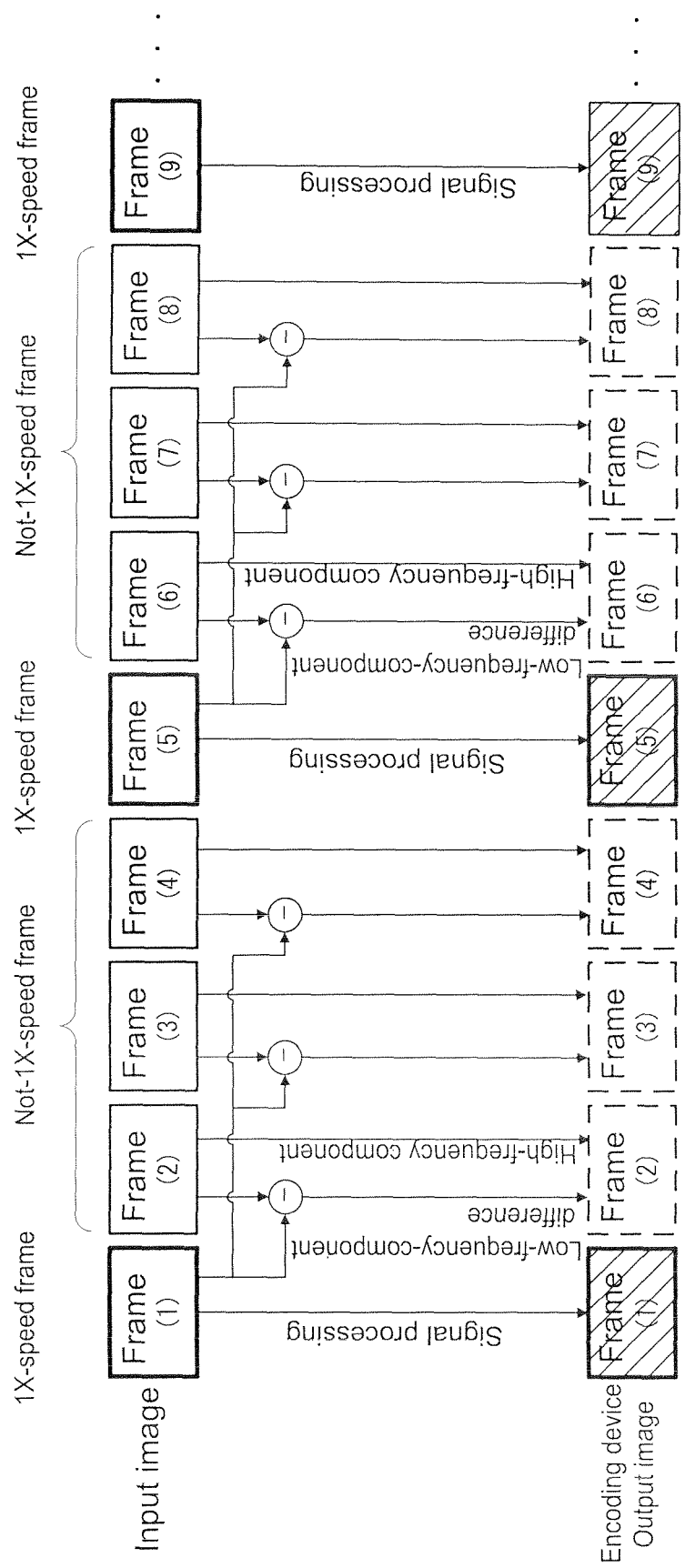
FIG. 1 is a diagram showing an overview of high-speed image data and an encoding process thereto in first to fourth embodiments of the present technology.

The high-speed image data is data of video taken by a high-speed camera. The high-speed camera is capable of performing imaging at a high frame rate, e.g., several hundreds of frames per second, several thousands of frames per second, or tens of thousands of frames per second, in comparison with imaging by a typical camera at 24 or 30 frames per second. With such a high-speed camera, for example, images taken thereby at a frame rate of 120 frames per second are reproduced at a normal speed of 30 frames per second, thereby implementing high-definition slow-motion reproduction at one-quarter of the speed of 1×. Moreover, for 1×-speed reproduction of data of high-speed images taken at a speed of 120 frames per second, as shown in FIG. 1, the frames may be reproduced at intervals of ¼. In the description below, frames to be processed for the 1×-speed reproduction are referred to as "1×-speed frames" (first frames), and other frames as "not-1×-speed frames" (second frames).

[Overview of Encoding Device]

For signal processing to the high-speed image data as described above, the encoding device of the embodiments performs signal processing of a type designated by a user to the 1×-speed frames. The encoding device also applies frequency division to all of the frames to have low- and high-frequency components, and then compresses and encodes the high-frequency components in the not-1×-speed frames. The encoding device then obtains, for each of the not-1×-speed frames, data of a difference of low-frequency components between the not-1×-speed frame and the 1×-speed frame immediately preceding thereto, and compresses and encodes the resulting difference data. As to the difference data of the not-1×-speed frames as such, the encoding device combines compression codes therein with the compressed data of the high-frequency components in the not-1×-speed frames, and transmits the combined results together with the results of signal processing performed on the 1×-speed frames described above.

[Overview of Decoding Device]

On the other end, the decoding device of the embodiments separates the incoming image information into the 1×-speed frames having been subjected to signal processing, the compressed data of the high-frequency components in the not-1×-speed frames, and the compression codes in the low-frequency-component difference data of the not-1×-speed frames. The decoding device then expands the separated results, i.e., the compressed data of the high-frequency components in the not-1×-speed frames, and the compression codes in the low-frequency-component difference data. Thereafter, using the expanded low-frequency-component difference data and the low-frequency components in the 1×-speed frames having been subjected to signal processing, the decoding device decompresses the low-frequency components in the not-1×-speed frames having been approximately subjected to the signal processing. Using the decompressed low-frequency components in the not-1×-speed frames and the high-frequency components in the not-1×-speed frames, the decoding device then decompresses the not-1×-speed frames having been subjected to signal processing by the inverse operation of frequency division. The decompressed not-1×-speed frames are combined with the 1×-speed frames having been subjected to signal processing, and the combined results are output as decompressed images.

First Embodiment

Next, the first embodiment of the present technology is described in detail.

[Configuration of Encoding Device]

Figure 2:
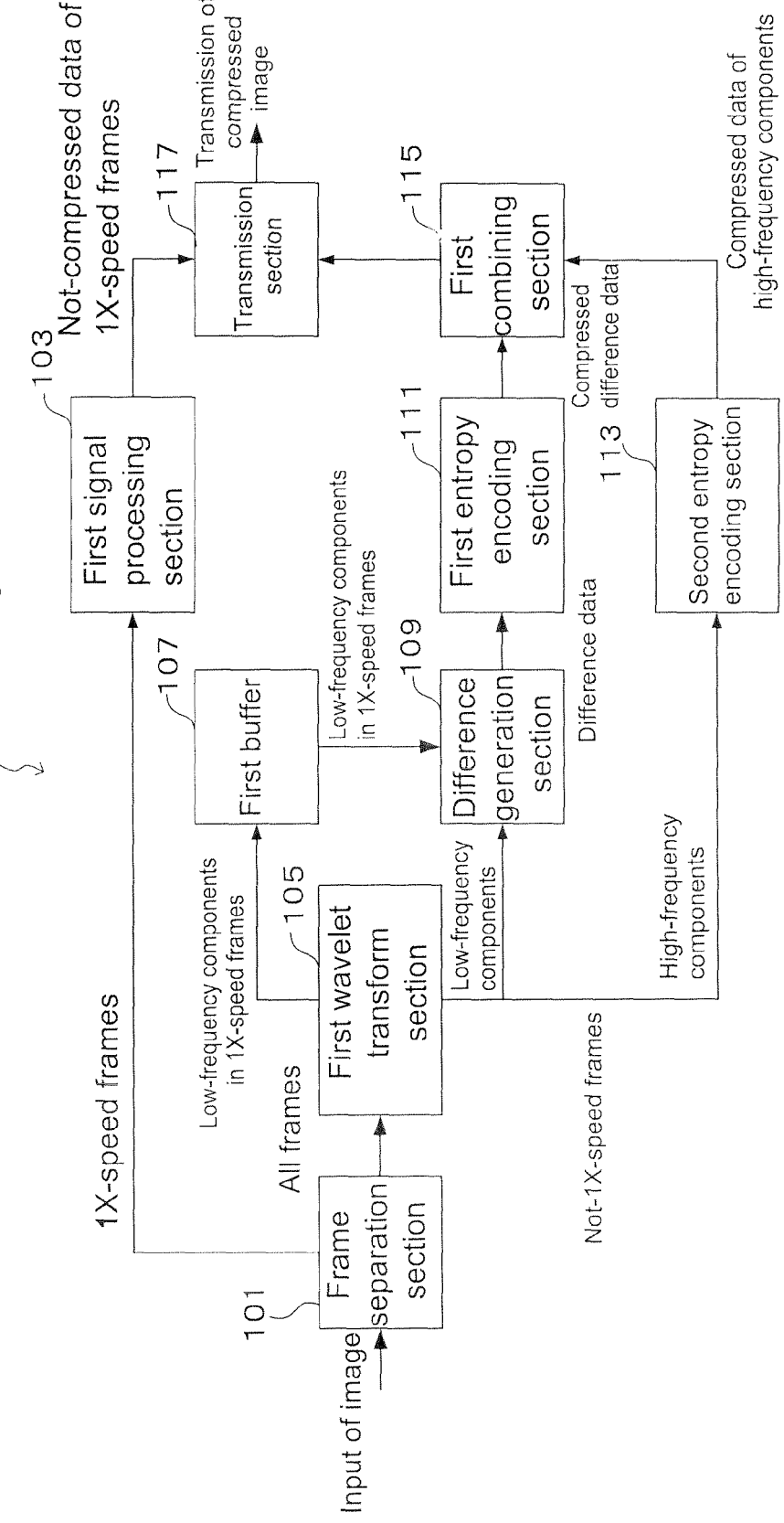
FIG. 2 is a block diagram showing the configuration of an encoding device in the first embodiment of the present technology.

FIG. 2 is a block diagram showing the configuration of the encoding device in the first embodiment of the present technology.

This encoding device 100 is configured to include a frame separation section 101, a first signal processing section 103, a first wavelet transform section 105, a first buffer 107, a difference generation section 109, a first entropy encoding section 111, a second entropy encoding section 113, a first combining section 115, and a transmission section 117.

The frame separation section 101 separates any 1×-speed frames from high-speed image data input by a high-speed camera that is not shown. The frame separation section 101 supplies the separated 1×-speed frames to the first signal processing section 103, and all of the frames including the 1×-speed frames to the first wavelet transform section 105.

The first signal processing section 103 performs signal processing of a type designated in advance by a user on the 1×-speed frames. The type of the signal processing will be described later.

The first wavelet transform section 105 (frequency division section) performs wavelet transform of frequency division with respect to the frames supplied by the frame separation section 101. With the wavelet transform, images are separated into low-frequency components, X-direction high-frequency components, Y-direction high-frequency components, and XY-direction high frequency components. The first wavelet transform section 105 stores, in the first buffer 107, the low-frequency components obtained by the wavelet transform performed on the 1×-speed frames. The first wavelet transform section 105 supplies, to the difference generation section 109, the low-frequency components obtained by the wavelet transform performed on the not-1×-speed frames, and supplies, and to the second entropy encoding section 113, the remaining components, i.e., the X-direction high-frequency components, the Y-direction high-frequency components, and the XY-direction high frequency components.

The first buffer 107 stores the low-frequency components obtained by the wavelet transform performed by the first wavelet transform section 105 on the 1×-speed frames.

The difference generation section 109 generates data of a difference between the low-frequency components obtained by performing the wavelet transform by the first wavelet transform section 105 on the not-1×-speed frames, and the low-frequency components of the 1×-speed frames, which are stored in the first buffer 107. The resulting difference data is supplied to the first entropy encoding section 111.

The first entropy encoding section 111 (compression and encoding section) compresses and encodes the difference data generated by the difference generation section 109 by entropy encoding. The entropy encoding includes Huffman coding, arithmetic coding, and others.

The second entropy encoding section 113 (compression and encoding section) compresses, by entropy encoding, the high-frequency components obtained by the wavelet transform performed by the first wavelet transform section, 105 on the not-1×-speed frames.

The first combining section 115 combines the output from the first entropy encoding section 111, i.e., the compressed low-frequency-component difference data of the not-1×-speed frames, and the output from the second entropy encoding section 113, i.e., the compressed data of the high-frequency components in the not-1×-speed frames. The first combining section 115 then supplies the combined results to the transmission section 117.

The transmission section 117 transmits the not-compressed 1×-speed frames having been subjected to signal processing by the first signal processing section 103, and the combined results by the first combining section 115, i.e., the compressed data of the not-1×-speed frames.

[Operation of Encoding Device 100]

Described next is the operation of the encoding device 100.

Figure 3:
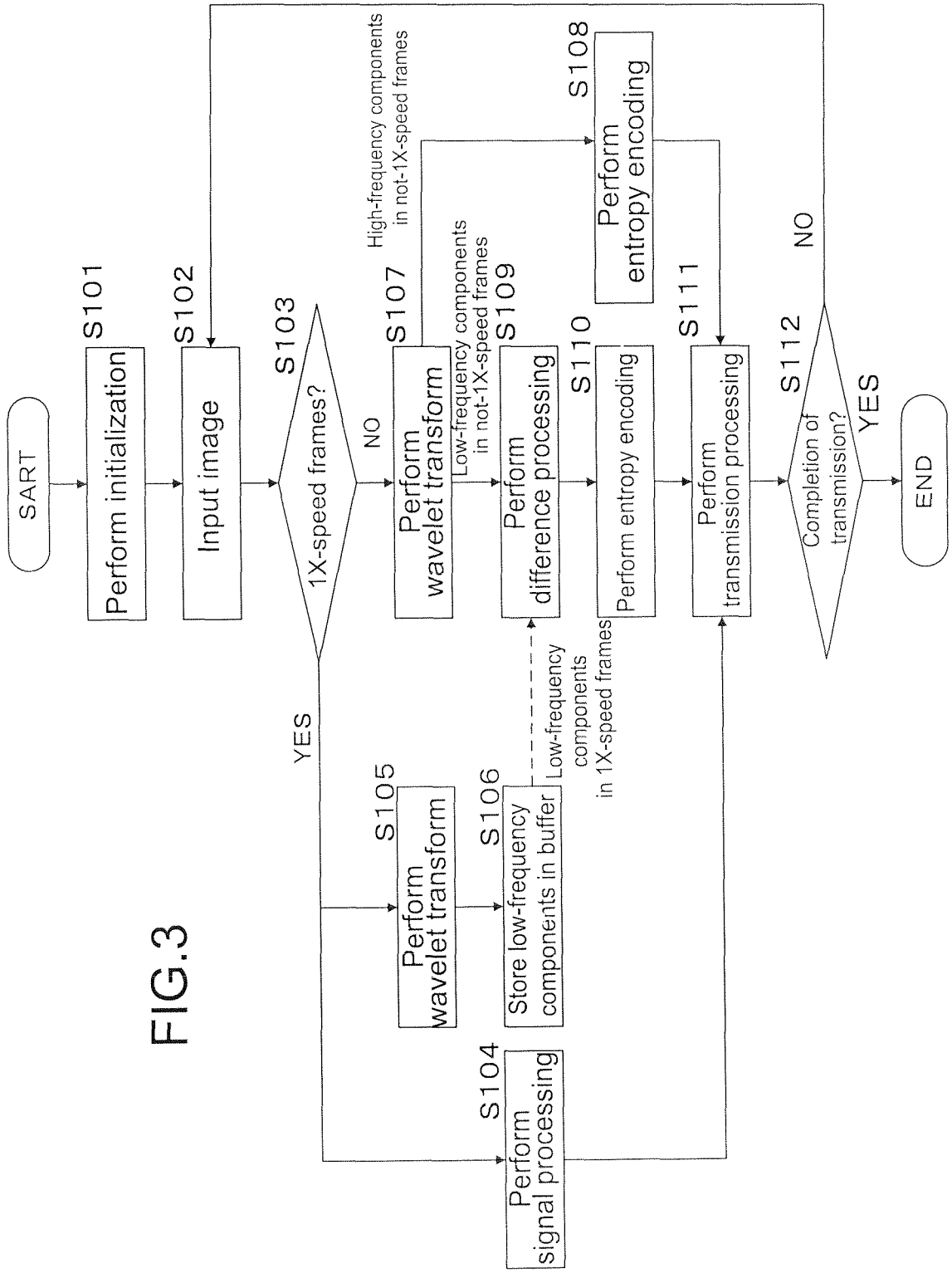
FIG. 3 is a flowchart representing the operation of the encoding device of FIG. 2.

FIG. 3 is a flowchart representing the operation of the encoding device 100.

First of all, an initialization process is performed on a register and a memory in the encoding device 100 (step S101).

After the completion of the initialization, high-speed image data is input by a high-speed camera that is not shown, for example (step S102).

The frame separation section 101 separates any 1×-speed frames from the input high-speed image data for supply to the first signal processing section 103, and supplies all of the frames including the 1×-speed frames to the first wavelet transform section 105 (step S103).

The first signal processing section 103 performs signal processing designated in advance on the supplied 1×-speed frames (step S104), and supplies the results to the transmission section 117. As such, the results of the signal processing performed on the 1×-speed frames are transmitted (step S111).

On the other hand, the first wavelet transform section 105 operates differently when inputs thereto are the 1×-speed frames and when inputs thereto are the not-1×-speed frames.

When the inputs to the first wavelet transform section 105 are the 1×-speed frames, the first wavelet transform section 105 performs wavelet transform on the 1×-speed frames (step S105), and stores the low-frequency components in the 1×-speed frames in the first buffer 107 (step S106).

Moreover, when the inputs to the first wavelet transform section 105 are the not-1×-speed frames, the first wavelet transform section 105 performs wavelet transform on the not-1×-speed frames (step S107). The first wavelet transform section 105 then supplies the low-frequency components in the not-1×-speed frames to the difference generation section 109, and the high-frequency components therein to the second entropy encoding section 113. The high-frequency components in the not-1×-speed frames are compressed and encoded by the second entropy encoding section 113 (step S108), and the results are supplied to the first combining section 115.

On the other hand, the difference generation section 109 calculates a difference between the low-frequency components of the not-1×-speed frames, which are supplied by the first wavelet transform section 105, and the low-frequency components of the 1×-speed frames, which are stored in the first buffer 107 (step S109). This difference data is compressed and encoded by entropy encoding by the first entropy encoding section 111 (step S110), and in the first combining section 115, is then combined with the compressed data of the high-frequency components in the not-1×-speed frames. The combining results are transmitted by the transmission section 117 (step S111).

The operation described above is repeated while the high-speed image data is input from the high-speed camera that is not shown (step S112).

Figure 4:
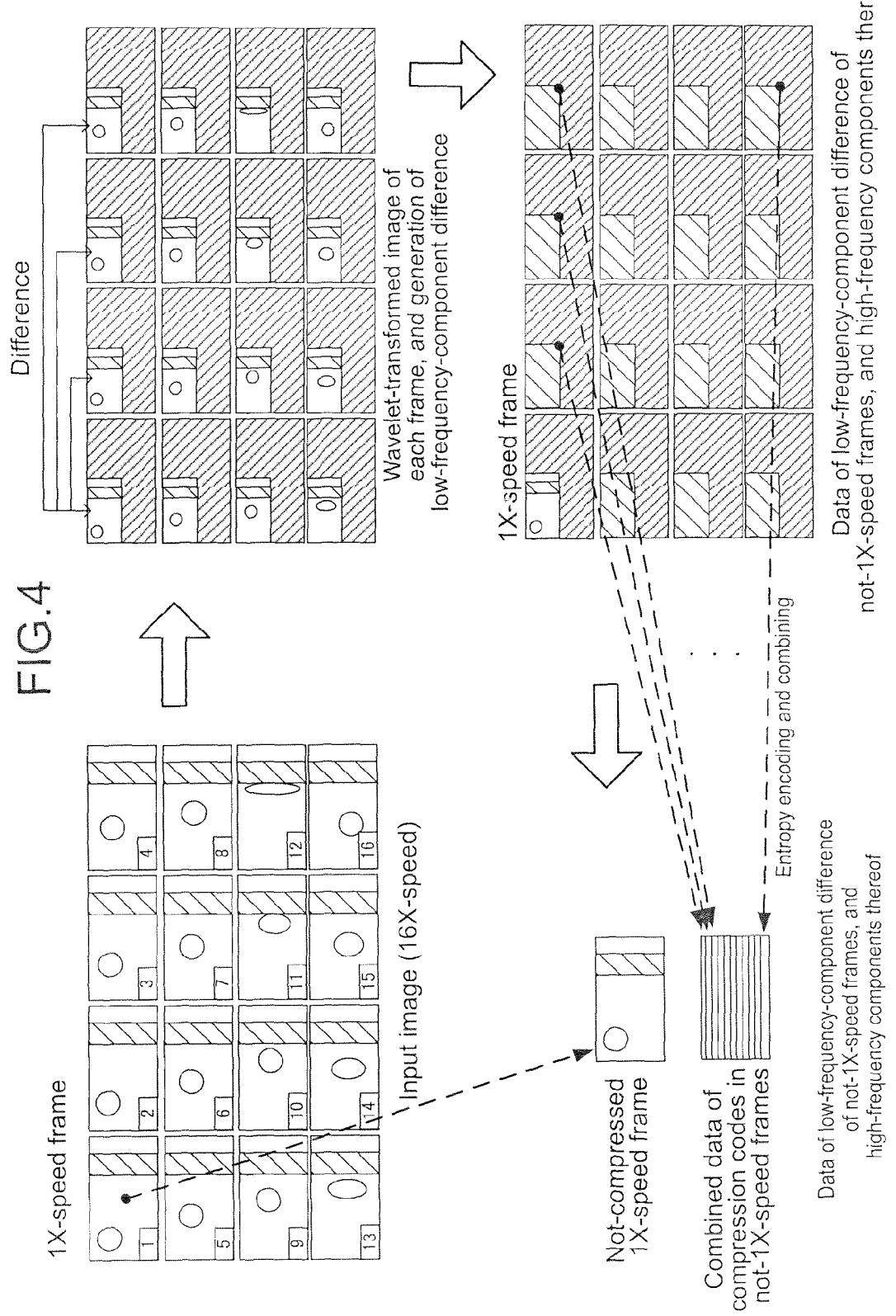
FIG. 4 is a diagram showing a process performed by the encoding device of FIG. 2 on 16× high-speed image data.

FIG. 4 is a diagram showing a process performed by the encoding device 100 on high-speed image data of 16× speed (16 frames per second).

Note that although frames respectively have frame numbers (1 to 16) on the left-hand corner for convenience, the actual image has no such frame numbers.

In this example, the frame having the frame number of 1 is assumed to be a 1×-speed frame. This 1×-speed frame is transmitted without being compressed. The remaining 15 frames having the frame numbers of 2 to 16 are each processed as a not-1×-speed frame. All of the frames with the frame numbers of 1 to 16 are subjected to wavelet transform by the first wavelet transform section 105. After the wavelet transform, a low-frequency component in the 1×-speed frame is stored in the first buffer 107. As to the low-frequency component stored in this first buffer 107, the difference generation section 109 then calculates a difference thereof from a low-frequency component in each of the frames with the frame numbers of 2 to 16. The resulting difference data of each of the frames is compressed and encoded in the first entropy encoding section 111. After the compression and encoding as such, the difference data of each of the frames is combined with data of a high-frequency component in the same frame that has been compressed and encoded by the second entropy encoding section 113. The combined results are then transmitted by the transmission section 117.

[Configuration of Decoding Device]

Described next is a decoding device for use in combination with the encoding device 100 in the embodiment described above.

Figure 5:
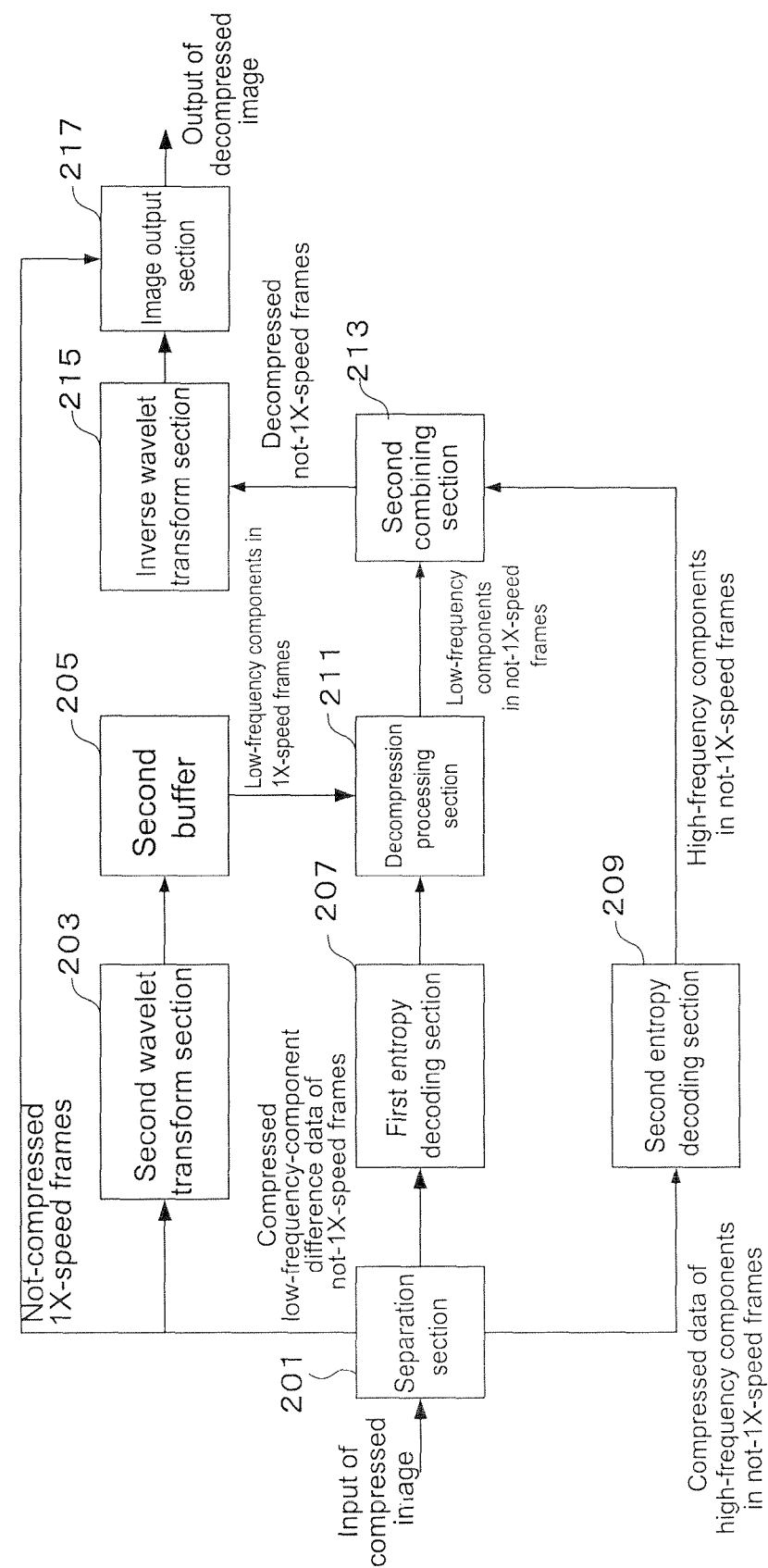
FIG. 5 is a block diagram showing the configuration of a decoding device for use in combination with the encoding device of FIG. 2.

FIG. 5 is a block diagram showing the configuration of the decoding device.

This decoding device 200 is configured to include a separation section 201, a second wavelet transform section 203, a second buffer 205, a first entropy decoding section 207, a second entropy decoding section 209, a decompression processing section 211, a second combining section 213, an inverse wavelet transform section 215, and an image output section 217.

The separation section 201 separates the compressed image data transmitted by the encoding device 100 into the not-compressed 1×-speed frames having been subjected to signal processing, the compressed low-frequency-component difference data of the not-1×-speed frames, and the compressed data of the high-frequency components in the not-1×-speed frames.

The second wavelet transform section 203 performs wavelet transform of frequency division with respect to the not-compressed 1×-speed frames separated by the separation section 201. The second wavelet transform section 203 causes the second buffer 205 to store therein the low-frequency components in the 1×-speed frames obtained by the wavelet transform.

The first entropy decoding section 207 (expansion section) expands, by entropy decoding, the compressed difference data separated by the separation section 201.

The second entropy decoding section 209 (expansion section) expands, by entropy decoding, the compressed data of the high-frequency components separated by the separation section 201.

Using the difference data expanded by the first entropy decoding section 207, and the low-frequency components in the not-compressed 1×-speed frames stored in the second buffer 205, the decompression processing section 211 (low-frequency-component decompression section) decompresses the low-frequency components in the not-1×-speed frames having been approximately subjected to signal processing.

The second combining section 213 combines, as a wavelet-transformed image of each frame, the low-frequency components in the not-1×-speed frames obtained by the decompression processing section 211, and the high-frequency components in the not-1×-speed frames obtained by the second entropy decoding section 209.

Using the wavelet-transformed images being the combined results by the second combining section 213, the inverse wavelet transformation section 215 (frame decompression section) decompresses the not-1×-speed frames. The resulting not-1×-speed frames are supplied to the image output section 217.

The image output section 217 outputs the not-compressed 1×-speed frames separated by the separation section 201, and the not-1×-speed frames obtained by the inverse wavelet transform section 215 as decompressed images.

[Operation of Decoding Device 200]

Described next is the operation of this decoding device 200.

First of all, an initialization process is performed on a register and a memory in the decoding device 200.

Thereafter, the separation section 201 is provided with the compressed images coming from the encoding device 100 described above.

The not-compressed 1×-speed frames separated by the separation section 201 are supplied as they are to the image output section 217. Therefore, when the decoding device 200 is instructed by a user to perform 1×-speed image reproduction, the separation section 201 may separate only the not-compressed 1×-speed frames from the input compressed images for supply to the image output section 217.

When the decoding device 200 is instructed by the user to perform slow-motion reproduction, the separation section 201 separates the compressed images into the not-compressed 1×-speed frames, the compressed low-frequency-component difference data of the not-1×-speed frames, and the compressed data of high-frequency components in the not-1×-speed frames. The not-compressed 1×-speed frames separated by the separation section 201 are supplied to both the image output section 217 and the second wavelet transform section 203. The second wavelet transform section 203 supplies, to the second buffer 205, the low-frequency components obtained by the wavelet transform performed on the not-compressed 1×-speed frames for storage therein.

The compressed low-frequency-component difference data of the not-1×-speed frames separated by the separation section 201 is expended in the first entropy decoding section 207. The resulting low-frequency-component difference data is supplied to the decompression processing section 211. Upon reception of the low-frequency-component difference data, the decompression processing section 211 reads the low-frequency components in the 1×-speed frames from the second buffer 205. Using the low-frequency components in the 1×-speed frames and the low-frequency-component difference data of the not-1×-speed frames, the decompression processing section 211 decompresses the low-frequency components in the not-1×-speed frames that have been approximately subjected to signal processing. Such a decompression process is performed by subtracting the difference data from the low-frequency components in the 1×-speed frames, for example. Because the not-compressed 1×-speed frames are those having been subjected to signal processing in the encoding device 100, the low-frequency components in the not-1×-speed frames to be decompressed by the decompression processing section 211 are to be those having been approximately subjected to signal processing. The low-frequency components in the not-1×-speed frames decompressed as such are supplied to the second combining section 213.

Moreover, the compressed data of the high-frequency components in the not-1×-speed frames separated by the separation section 201 is expended by the second entropy decoding section 209, and then is supplied to the second combining section 213. The second combining section 213 combines the low-frequency components in the not-1×-speed frames decompressed by the decompression processing section 211 with the high-frequency components in the not-1×-speed frames expanded by the second entropy decoding section 209. The combined results are supplied to the inverse wavelet transform section 215. Using the supplied low- and high-frequency components in the not-1×-speed frames, the inverse wavelet transform section 215 decompresses the not-1×-speed frames by inverse wavelet transform for supply to the image output section 217. In this manner, the not-1×-speed frames are output from the image output section 217.

From the image output section 217, the 1×-speed frames and the not-1×-speed frames are output continuously in order of the frame numbers, and by the repeated output as such, the images are reproduced in slow motion.

According to the first embodiment described above, only by performing signal processing on 1×-speed frames, images to be reproduced in slow motion are approximately subjected to signal processing in their entirety. This accordingly reduces the size of the signal processing section in charge of applying signal processing to high-speed images, and also reduces the power consumption. Moreover, according to the first embodiment, with the effect of reduced hardware size, the transmission amount of codes of the not-1×-speed frames is reduced, thereby improving the transmission efficiency of the high-speed images.

Second Embodiment

Described next is an encoding device 100A in the second embodiment of the present technology.

The encoding device 100A in the second embodiment characteristically performs signal processing not only on the 1×-speed frames but also on any portion in the not-1×-speed frames where a difference of low-frequency components from the 1×-speed frames is a threshold value or more.

Figure 6:
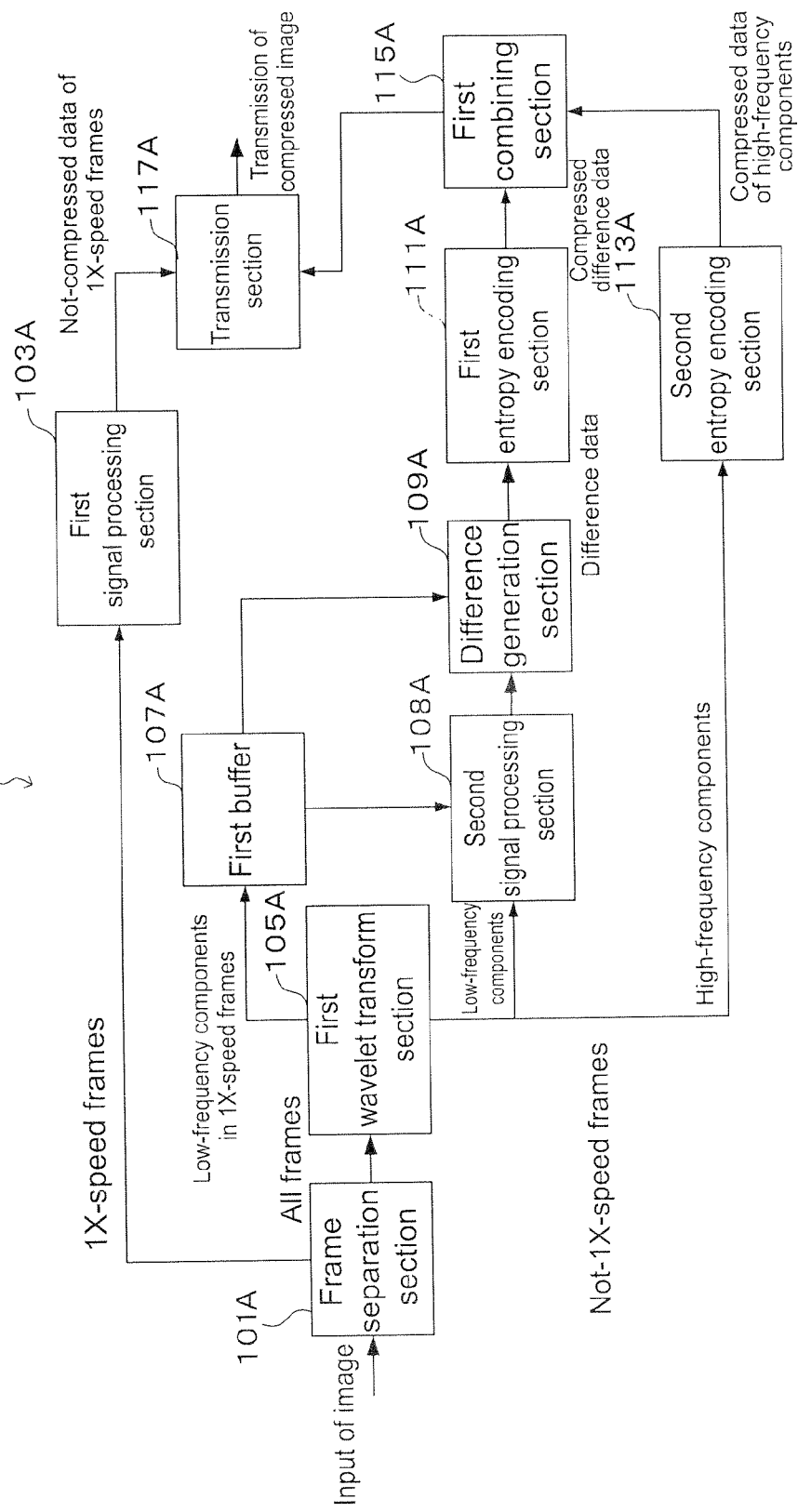
FIG. 6 is a block diagram showing the configuration of an encoding device in the second embodiment of the present technology.
Figure 7:
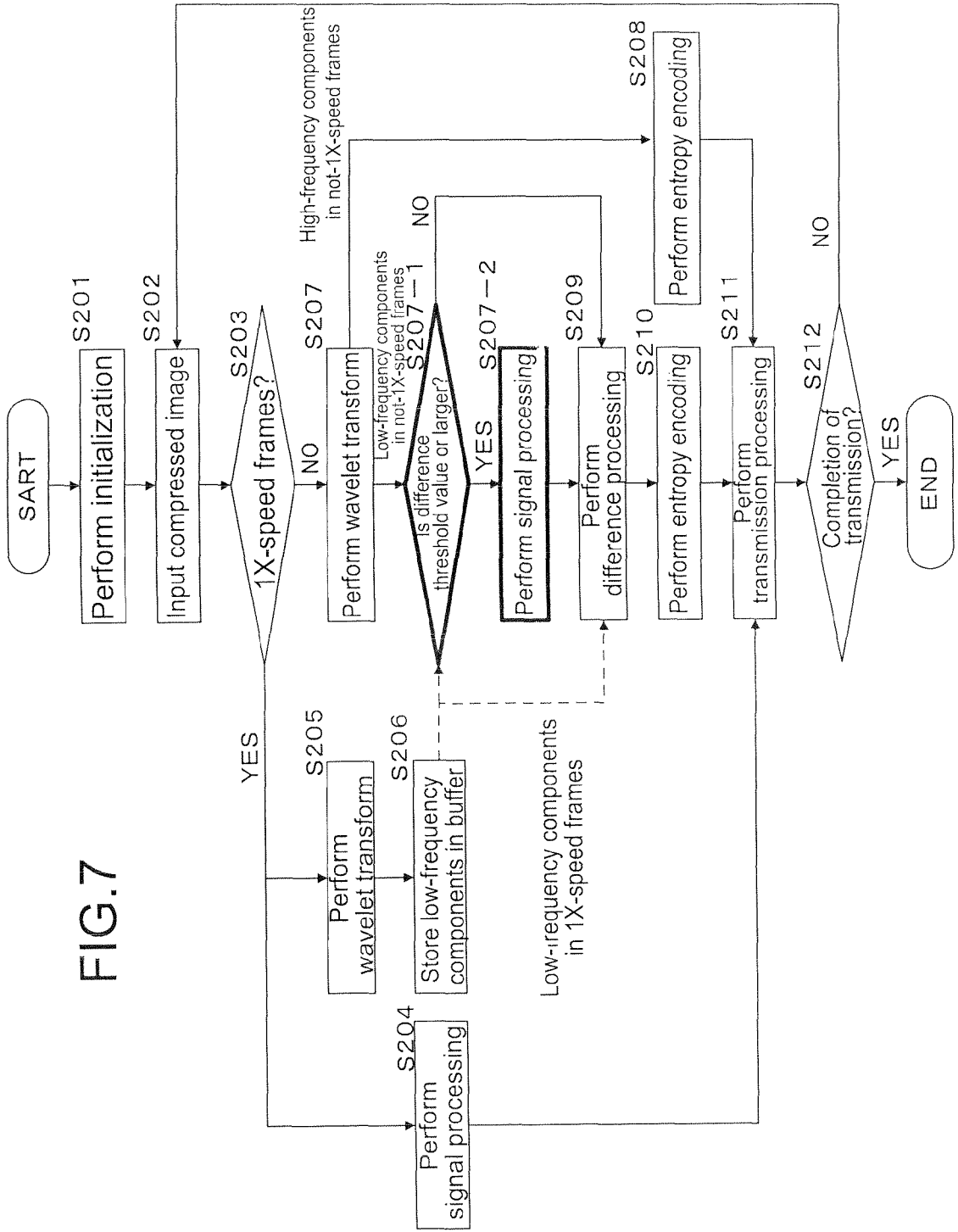
FIG. 7 is a flowchart representing the operation of the encoding device of FIG. 6.

FIG. 6 is a block diagram showing the configuration of the encoding device 100A in the second embodiment of the present technology. FIG. 7 is a flowchart representing the operation of the encoding device 100A in this embodiment.

Compared with the encoding device 100 in the first embodiment, the encoding device 100A in this embodiment is additionally provided with a second signal processing section 108A. The remaining configuration is the same as that of the encoding device 100 in the first embodiment except that the components therein are each provided with "A" at the tail of each reference numeral.

The second signal processing section 108A determines a portion where a difference of low-frequency components is a threshold value or more between the low-frequency components of the not-1×-speed frames, which are output by the first wavelet transform section 105A, and the low-frequency components of the 1×-speed frames, which are stored in the first buffer 107A (step S207-1). The second signal processing section 108A performs signal processing on the defined portion (step S207-2) but not on the remaining portions. The output of the second signal processing section 108A is provided to the difference generation section 109A. The difference generation section 109A obtains data of a difference between the output from the second signal processing section 108A and the low-frequency components in the 1×-speed frames that are read from the first buffer 107A. The resulting difference data is supplied to the first entropy encoding section 111A (step S209). The operation thereafter is similar to that of the encoding device 100A in the first embodiment.

As such, in the second embodiment, the first signal processing section 103A performs signal processing on the 1×-speed frames, and the second signal processing section 108A performs signal processing on any portion where a difference of low-frequency components is a threshold value or more between the low-frequency components of the not-1×-speed frames, which are output by the first wavelet transform section 105A, and the low-frequency components of the 1×-speed frames, which are stored in the first buffer 107A. As such, although the total amount of signal processing is increased to some extent compared with the case of performing signal processing only on the 1×-speed frames as in the first embodiment, signal processing to the not-1×-speed frames is performed better. As such, the image quality at the time of slow-motion reproduction is expected to be increased.

Note here that the compressed images to be obtained by this encoding device 100A are to be decompressed by the decoding device 200 in the first embodiment.

Third Embodiment

Described next is an encoding device in the third embodiment of the present technology.

Figure 8:
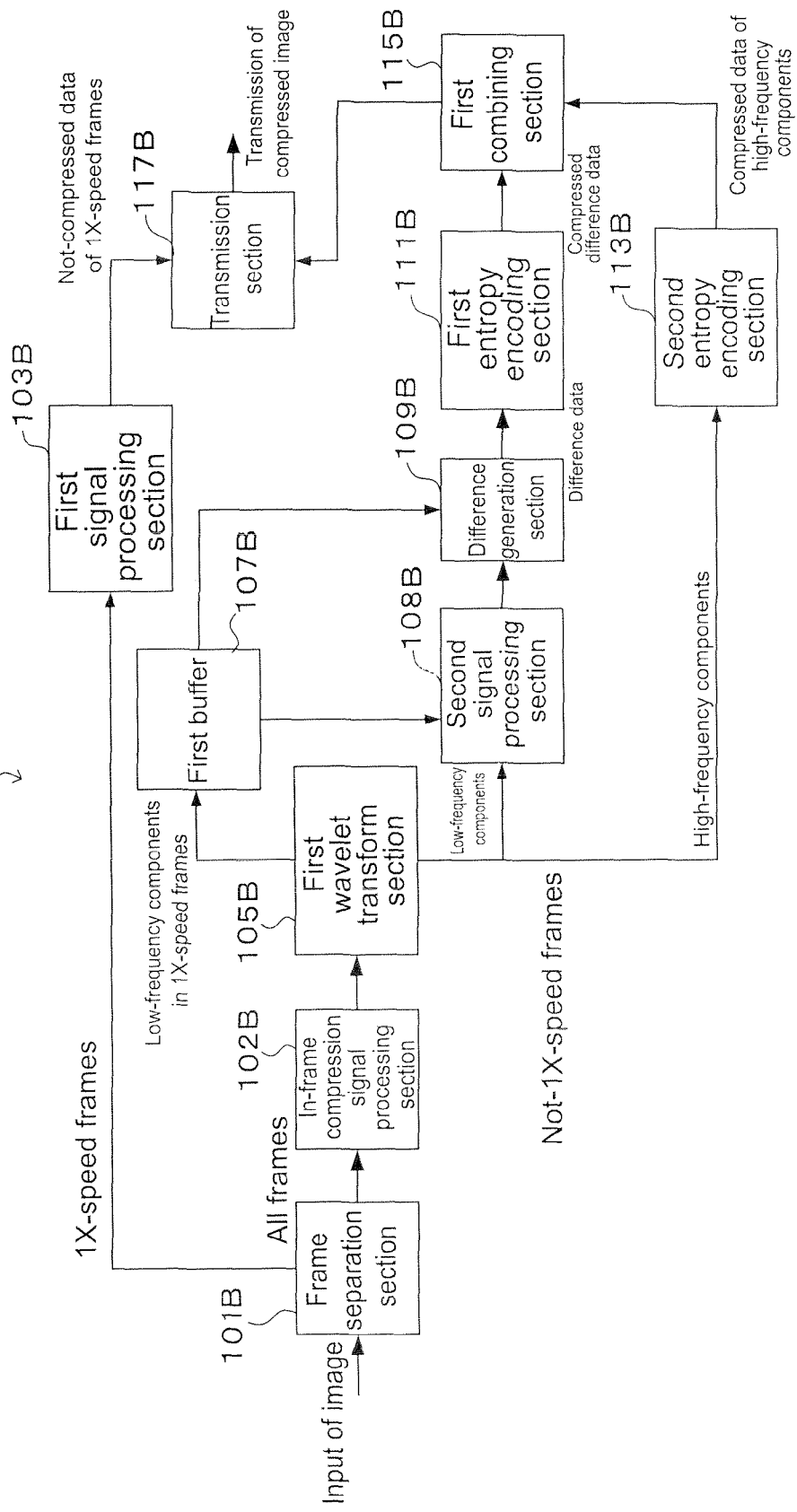
FIG. 8 is a block diagram showing the configuration of an encoding device in the third embodiment of the present technology.
Figure 9:
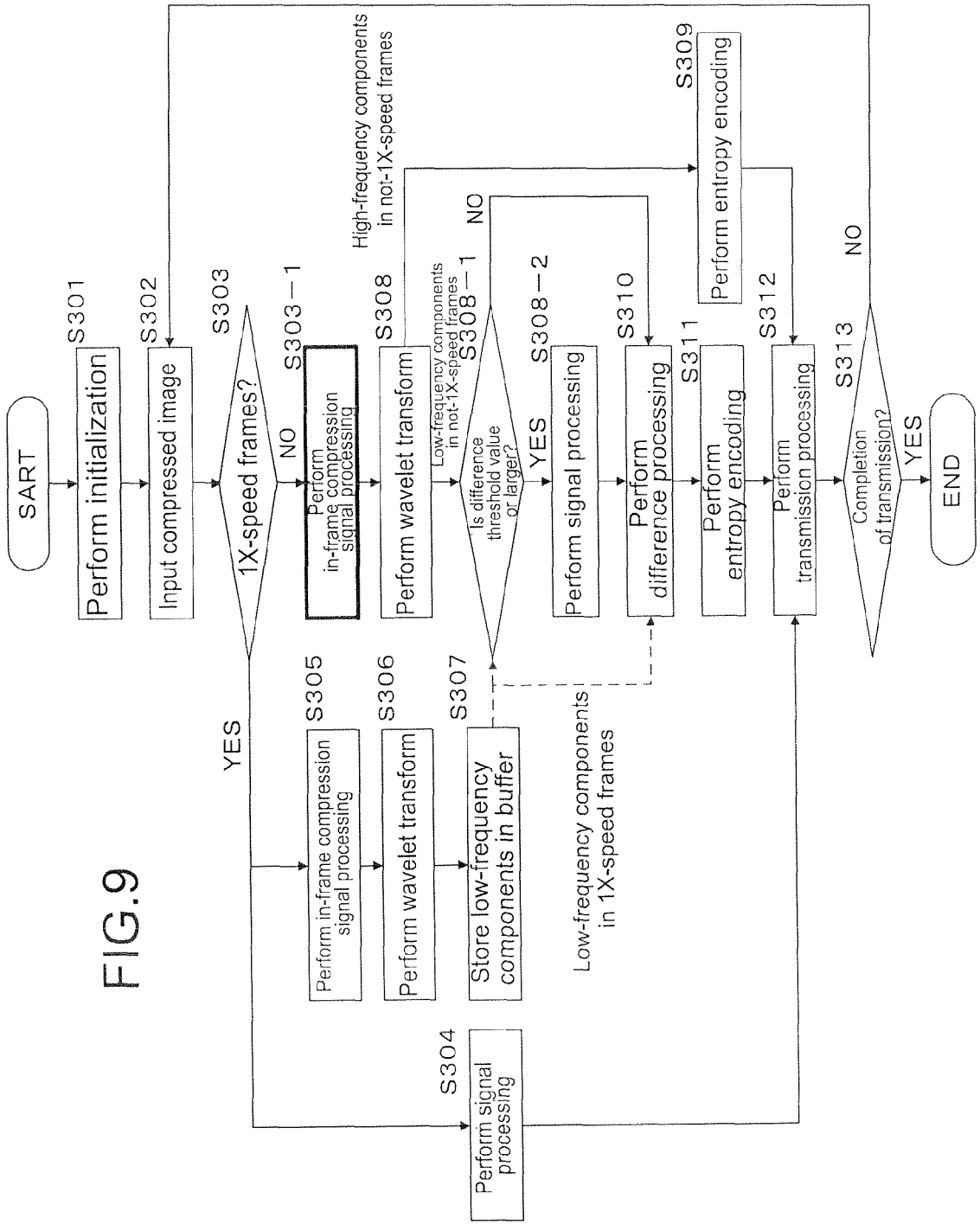
FIG. 9 is a flowchart representing the operation of the encoding device of FIG. 8.

FIG. 8 is a block diagram showing the configuration of an encoding device 100B in the third embodiment of the present technology. FIG. 9 is a flowchart representing the operation of the encoding device 100B in this embodiment.

Compared with the encoding device 100A in the second embodiment, the encoding device 100B in this embodiment is additionally provided with an in-frame compression signal processing section 102B. The remaining configuration is the same as that of the encoding device 100A in the second embodiment except that the components therein are each provided with "B" instead of "A" at the tail of each reference numeral.

The in-frame compression signal processing section 102B extracts, from every frame in an image, the position of one or more pixels characterizing the image as a characteristic point(s). The in-frame compression signal processing section 102B applies signal processing to the extracted pixels being the characteristic points, and based on the results of the signal processing, creates an interpolation value for replacement of the values of pixels not being the characteristics points. In this manner, the pixels in the frames are not entirely subjected to signal processing, but the resulting image is substantially the same as that with signal processing performed on every pixel in the frames.

Figure 11:
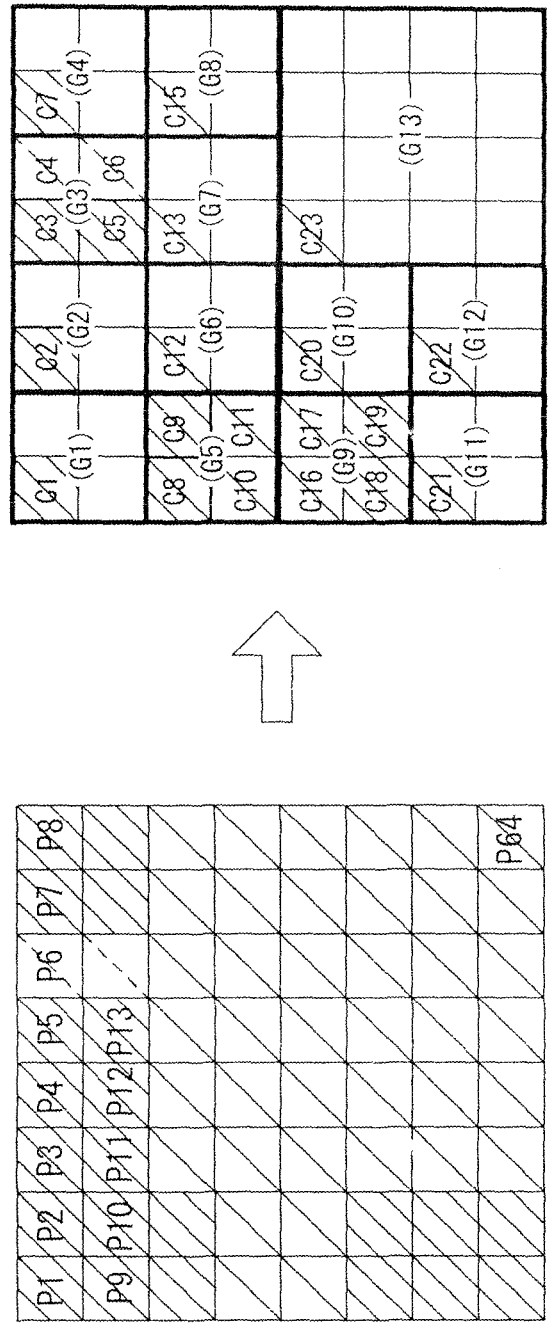
FIG. 11 is a diagram illustrating a method of extracting a pixel as a characteristic point for each group being a rectangular region where a pixel-to-pixel difference falls within a threshold range.

FIGS. 10 to 12 are each a diagram illustrating a method of extracting characteristic points through analysis of frequency components in an image.

The method of extracting characteristic points is exemplified as below.

A. The in-frame compression signal processing section 102B scans an image in the horizontal direction (or in the vertical direction), and finds a pixel as a characteristics point in each pixel group. The pixel group is a region where a difference between the pixels adjacent to each other in the scanning direction is within a threshold range. The threshold value herein is arbitrarily selected based on the type of signal processing (refer to FIG. 10).

B. The in-frame compression signal processing section 102B finds a pixel as a characteristic point in each rectangular region (group), where a difference between the pixels adjacent to each other in the horizontal or vertical direction is within a threshold range (refer to FIG. 11).

C. The in-frame compression signal processing section 102B performs wavelet transform on the basis of, for example, a region of 2×2 pixels and a region of 4×4 pixels to have low- and high-frequency components. The in-frame compression signal processing section 102B finds one or more pixels as characteristic points in each group. This group is a region of the maximum number of pixels obtained by the wavelet transform performed on the regions of 2×2 pixels and 4×4 pixels, and in the region, the value of a difference, e.g., average value or maximum value, between the pixels in the vertical, lateral, and slanting directions is within a threshold range. In such a region obtained by the wavelet transform performed on the region of 2×2 pixels, when the value of a difference, e.g., average value or maximum value, is not within the threshold range between the pixels in the vertical, lateral, and slanting directions, the in-frame compression signal processing section 102B defines the 2×2 pixels all as characteristic points (refer to FIG. 12). Note that, in FIG. 12, exemplified is the case of performing the wavelet transform on the regions of 2×2 pixels and 4×4 pixels. Alternatively, the wavelet transform may be performed on the basis of a region of a larger number of pixels for extraction of characteristic points.

In the following description in the third embodiment, described in detail is a case of extracting characteristic points using the method of A described above, but the remaining other methods are also similarly used.

In FIG. 10, with respect to an input image, the in-frame compression signal processing section 102B calculates a difference between pixels adjacent to each other in the scanning direction in order of P1-to-P2, P2-to-P3, P3-to-P4, and the like. In the image of FIG. 10, a rectangle corresponds to a pixel, and the rectangles in the same design means that a difference of pixels adjacent to each other in the scanning direction falls within a threshold range. Moreover, one or more successive pixels in the scanning direction being in the same design means that these pixels form a pixel group. For example, the series of pixels from P1 to P5 forms a pixel group G1, the pixel P6 forms a pixel group G2, and the series of pixels from P7 to P13 forms a pixel group G3. In this example, 12 pixel groups of G1 to G12 are the targets for extraction of characteristic points by the in-frame compression signal processing section 102B.

The in-frame compression signal processing section 102B then defines a pixel as a characteristic point in each of the pixel groups. As an example, FIG. 10 shows a case where the first pixel in the scanning direction in each of the pixel groups is defined as a characteristic point, i.e., C1 to C12.

The in-frame compression signal processing section 102B performs signal processing designated by a user on the pixels being the characteristic points in the frames, and using the results of the signal processing, interpolates the values of pixels not being the characteristic points (step S303-1 in FIG. 9). For interpolation as such, the results of the signal processing performed on the characteristic point may be used for interpolation of the values of pixels not being the characteristics point in the pixel group to which the characteristic point belongs, for example. Such an interpolation method is exemplified by a copy method with which the results of signal processing performed on the characteristic point is provided as they are to the pixels not being the characteristic point, but the present technology is not restrictive thereto.

In the stage subsequent to the in-frame compression signal processing section 102B, the output from the in-frame compression signal processing section 102B is processed by the components similarly to the encoding device 100A in the second embodiment, i.e., by a first wavelet transform section 105B, a second signal processing section 108B, a difference generation section 109B, a first entropy encoding section 111B, and a second entropy encoding device 113B.

According to the encoding device 100B in this embodiment, the in-frame compression signal processing section 102B performs signal processing specifically on the pixels being the image characteristic points in the not-1×-speed frames, and using interpolation values created based on the results of the signal processing, the values of the pixels not being the characteristic points are replaced. As such, the pixels in the not-1×-speed frames are not expected to be entirely subjected to signal processing, but the resulting image is substantially the same as that with signal processing performed on every pixel in the not-1×-speed frames. The signal processing to the not-1×-speed frames is thus performed better, and the image quality at the time of slow-motion reproduction is thus expected to be increased.

Moreover, as to the low-frequency components in the not-1×-speed frames, any portion where a difference thereof from the low-frequency components in the 1×-speed frames is large is subjected to signal processing separately by the second signal processing section 108B. As such, the image quality at the time of slow-motion reproduction is expected to be increased more.

Fourth Embodiment

Described next is the fourth embodiment of the present technology.

The encoding devices in the embodiments described above are all adopting the technology of performing wavelet transform and entropy encoding on not-1×-speed frames. However, when reduction of the total operational complexity for signal processing of high-speed images is the main concern, the technology of wavelet transform and entropy encoding is not indispensable. In consideration thereof, described next is an image processing apparatus mainly for reduction of the total operational complexity for signal processing of high-speed images.

Figure 13:
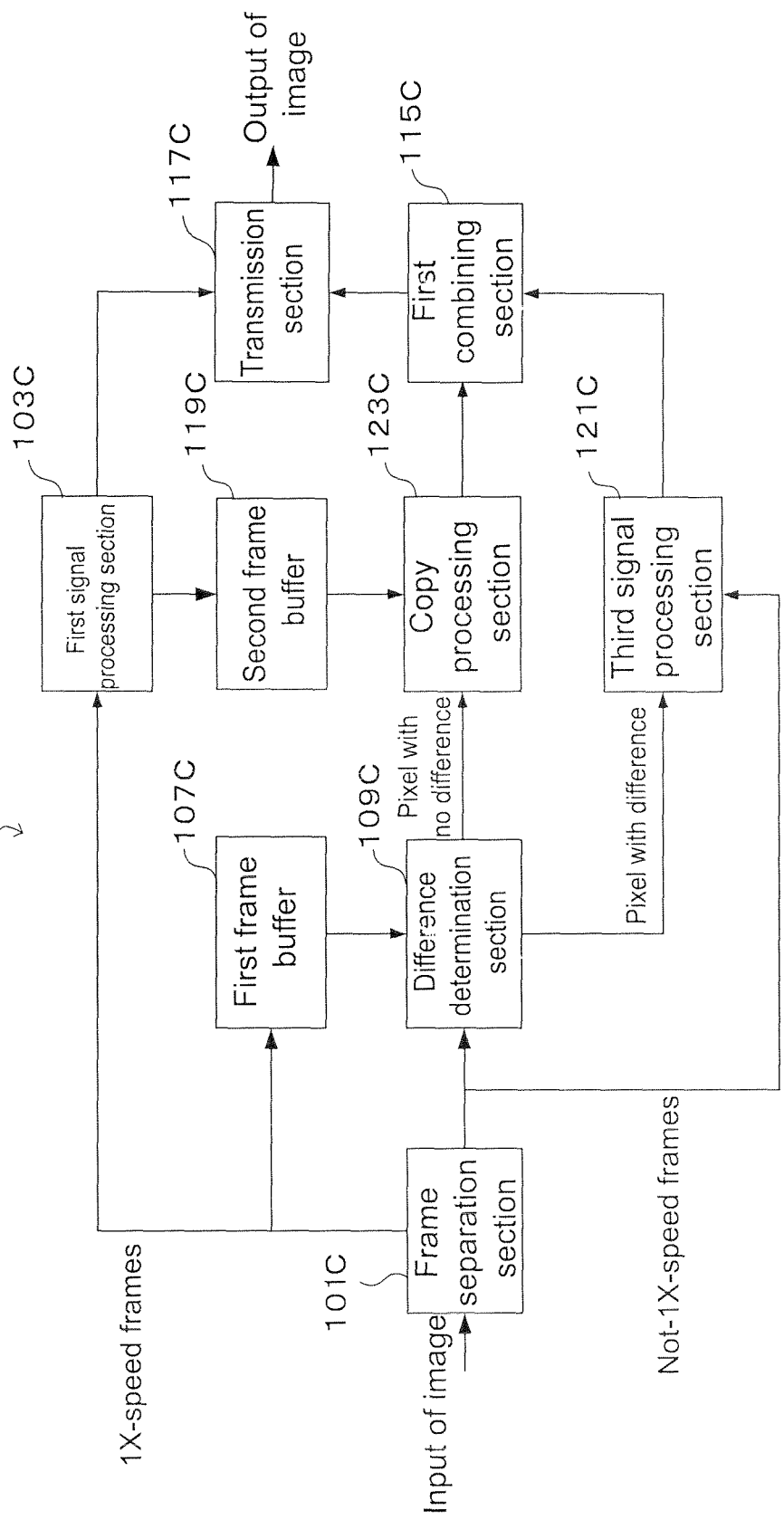
FIG. 13 is a block diagram showing the configuration of an image processing apparatus in the fourth embodiment of the present technology.

FIG. 13 is a block diagram showing the configuration of an image processing apparatus in the fourth embodiment of the present technology.

This image processing apparatus 100C is configured to include a frame separation section 101C, a first signal processing section 103C, a first frame buffer 107C, a second frame buffer 119C, a difference determination section 109C, a third signal processing section 121C, a copy processing section 123C, a first combining section 115C, and a transmission section 117C.

The frame separation section 101C separates any 1×-speed frames from high-speed image data input by a high-speed camera that is not shown, and supplies the 1×-speed frames to the first signal processing section 103C.

The first signal processing section 103C performs signal processing designated by a user on the 1×-speed frames separated by the frame separation section 101C.

The first frame buffer 107C stores the 1×-speed frames separated by the frame separation section 101C.

The second frame buffer 119C stores the 1×-speed frames having been subjected to signal processing by the first signal processing section 103C.

The difference determination section 109C (comparison section) requests the third signal processing section 121C to perform signal processing on any pixels in the not-1×-speed frames separated by the frame separation section 101C, i.e., any pixels determined to have a difference of threshold value or more from the 1×-speed frames read from the first frame buffer 107C. As to the pixels determined not to have a difference of threshold value or more, the difference determination section 109C then requests the copy processing section 123C to perform a copy process thereon.

In response to the request by the difference determination section 109C, the third signal processing section 121C performs signal processing on the target pixels similarly to the first signal processing section 103C, and supplies the results to the first combining section 115C.

In response to the request by the difference determination section 109C, the copy processing section 123C provides the target pixels each with the value of a pixel located at the same position in the frames having been subjected to signal processing and stored in the second frame buffer 119C. The results are supplied to the first combining section 115C.

The first combining section 115C combines the output from the third signal processing section 121C with the output from the copy processing section 123C, thereby creating not-1×-speed frames having been approximately subjected to signal processing.

The transmission section 117C transmits the 1×-speed frame supplied by the first signal processing section 103C, and the not-1×-speed frame supplied by the first combining section 115C.

[Operation of Image Processing Apparatus 100C]

Figure 14:
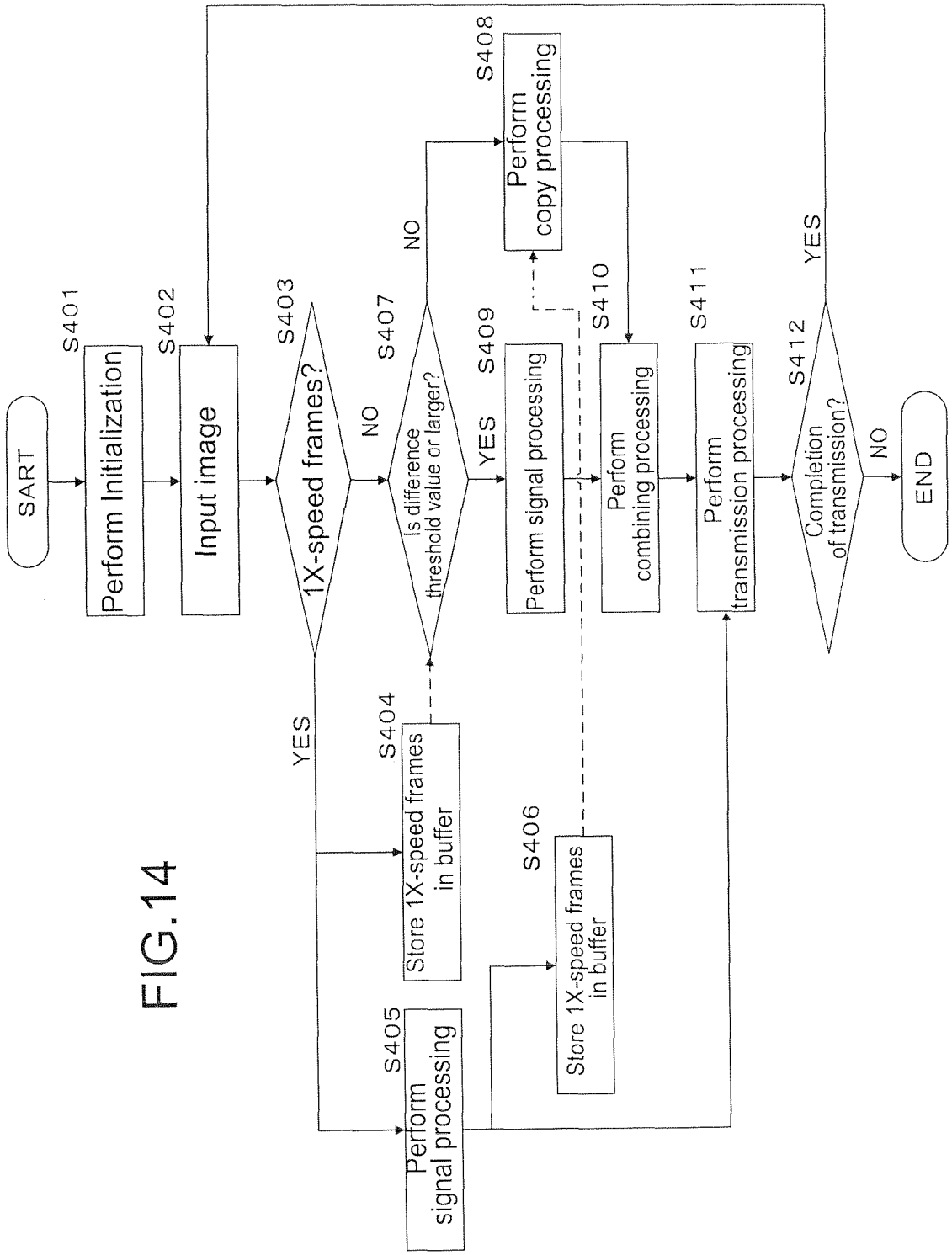
FIG. 14 is a flowchart representing the operation of the image processing apparatus in the fourth embodiment.

FIG. 14 is a flowchart representing the operation of the image processing apparatus in the fourth embodiment.

First of all, an initialization process is performed on a register and a memory in the image processing apparatus 100C (step S401). After the completion of the initialization, high-speed image data is input from a high-speed camera that is not shown, for example (step S402).

The frame separation section 101C separates any 1×-speed frames from the input high-speed image data, and supplies the 1×-speed frames to both the first signal processing section 103C and the first frame buffer 107C. The frame separation section 101C supplies not-1×-speed frames to the difference determination section 109C (step S403). In this manner, the 1×-speed frames are stored in the first frame buffer 107C (step S404). The 1×-speed frames stored in this first frame buffer 107C remain stored until any new 1×-speed frames are supplied by the frame separation section 101C.

The first signal processing section 103C performs signal processing of a type designated in advance on the 1×-speed frames supplied by the frame separation section 101C, and supplies the results to the transmission section 117C (step S405). In this manner, the 1×-speed frames having been subjected to signal processing are transmitted (step S411). The 1×-speed frames having been subjected to signal processing are supplied to the second frame buffer 119C for storage therein (step S406).

On the other hand, as to the not-1×-speed frames supplied by the frame separation section 101C, the difference determination section 109C determines a difference thereof from the 1×-speed frames stored in the first frame buffer 107C. The difference determination section 109C requests the third signal processing section 121C to perform signal processing on any pixels determined to have a difference of threshold value or more. As to the pixels determined not to have a difference of threshold value or more, the difference determination section 109C requests the copy processing section 123C to perform a copy process thereon (step S407).

In response to the request by the difference determination section 109C, the third signal processing section 121C performs signal processing on any target pixels (step S409), and supplies the results to the first combining section 115C. On the other hand, in response to the request by the difference determination section 109C, the copy processing section 123C provides the target pixels each with the value of a pixel located at the same position in the frames having been subjected to signal processing and stored in the second frame buffer 119C (step S408). The results are supplied to the first combining section 115C.

The output from the third signal processing section 121C is spatially combined with the output from the copy processing section 123C in the combining section 115C, and as a result, the not-1×-speed frames having been approximately subjected to signal processing are decompressed (step S410). Thereafter, the not-1×-speed frames having been approximately subjected to signal processing are transmitted by the transmission section 117C (step S411).

The operation described above is repeated while the high-speed image data is input from the high-speed camera that is not shown (step S412), and the high-speed image data having been subjected to signal processing is continuously transmitted.

Note that the high-speed images transmitted after the signal processing by the image processing apparatus 100C in this embodiment are reproduced only by processing the frames in order.

According to the image processing apparatus 100C in this embodiment, only by performing signal processing on the 1×-speed frames and any pixels in the not-1×-speed frames determined to have a difference of threshold value or more from the 1×-speed frames, images to be reproduced in slow motion are approximately subjected to signal processing in their entirety. This accordingly reduces the size of the signal processing section in charge of applying signal processing to high-speed images, and also reduces the power consumption.

[About Signal Processing]

Described above is the effect of reducing the total operational complexity for signal processing achieved by the image processing apparatus in each of the embodiments described above, but in the real world, the effect of reducing the operational complexity varies depending on the type of signal processing.

Signal processing performed on the values of pixels mainly includes digital signal processing completed with a tap (Tap), and digital signal processing not completed with a tap. With the digital signal processing completed with a tap, an algorithm for signal processing to the n-th pixel uses only information about the n-th pixel. The digital signal processing completed with a tap as such includes white balance adjustment, black balance adjustment, gamma correction, Knee correction, WhiteClip correction, saturation correction, luminance correction, matrix correction, offset processing, shading correction, and vignetting correction, for example. With the digital signal processing not completed with a tap, an algorithm for signal processing to the n-th pixel uses not only information about the n-th pixel but also information about the pixels preceding and subsequent to, above and beneath, or around the n-th pixel in the coordinate space. The digital signal processing not completed with a tap as such includes low-pass filter, DNR (Digital Noise Reduction), high-pass filter, detailed processing, and magnification aberration correction, for example.

The encoding devices in the first to third embodiments described above each obtain, as to the low-frequency components in the not-1×-speed frames, data of a difference thereof from the low-frequency components in the 1×-speed frames before signal processing. Using the resulting difference data and information about pixels located at the same positions in the low-frequency components in the 1×-speed frames having been subjected to signal processing, the encoding devices generate low-frequency components in the 1×-speed frames having been approximately subjected to signal processing. Therefore, with the digital signal processing completed with a tap, the low-frequency components in the not-1×-speed frames having been approximately subjected to signal processing are generated with no problem. However, the embodiments are not suitable for the digital signal processing of a type using information about pixels around a pixel to obtain information thereabout (digital signal processing not completed with a tap).

Note that, with the digital signal processing not completed with a tap, low-pass processing using low-pass filter and DNR (Digital Noise Reduction) is exceptional. The reasons are as below. That is, with the encoding devices in the embodiments described above, information about the low-frequency components in the not-1×-speed frames is transmitted after being replaced with difference data. With such replacement of the low-frequency components in the not-1×-speed frames with difference data of a predetermined number of bits, any difference in the highest frequency range in the low-frequency components (minute difference) is to be neglected. As such, the encoding devices in the first to third embodiments each steadily operate as a low-pass device with respect to the low-frequency components, and thus are considered effective when the first signal processing section performs low-pass signal processing on the 1×-speed frames.

As such, described above are the method and apparatus for processing high-speed image data taken by a high-speed camera, and needless to say, the present technology is applicable also to a typical movie camera, or to an apparatus for processing image data taken by a video camera for an attempt to reduce the hardware size for signal processing, for example.

The present technology also takes the following structures.

(1) An image processing method, including:

separating an image taken at a predetermined frame rate into a first frame and at least one second frame other than the first frame at intervals of 1/n, where n is an integer of 2 or larger;

calculating a low-frequency-component difference between the separated at least one second frame and first frame;

performing signal processing designated by a user on the first frame;

decompressing, using a low-frequency component in the first frame being subjected to the signal processing and the low-frequency-component difference, a low-frequency component in the at least one second frame being approximately subjected to the signal processing; and decompressing, using the decompressed low-frequency component in the at least one second frame and a high-frequency component therein, the at least one second frame being approximately subjected to the signal processing.

(2) The image processing method according to (1), further including performing the signal processing on a pixel in the at least one second frame, the pixel having the low-frequency-component difference of a threshold value or more from the first frame before the signal processing.

(3) The image processing method according to (1) or (2), further including decompressing the at least one second frame being approximately subjected to the signal processing by analyzing a frequency component at least in the separated at least one second frame to extract a pixel being a characteristics point, by performing the signal processing on the pixel, and by generating an interpolation value based on a signal processing result for replacement of a value of a pixel not being the characteristic point.

(4) An encoding device, including:
a frame separation section configured to separate an image taken at a predetermined frame rate into a first frame and at least one second frame other than the first frame at intervals of 1/n, where n is an integer of 2 or larger;
a first frequency division section configured to divide each of the separated first frame and at least one second frame into a low frequency component and a high frequency component;
a difference generation section configured to generate difference data in low-frequency component between the at least one second frame and the first frame;
a compression and encoding section configured to compress and encode the difference data and the high-frequency component in the at least one second frame;
a first signal processing section configured to perform signal processing designated by a user on the separated first frame; and
a transmission section configured to transmit the difference data and the high-frequency component in the at least one second frame both being compressed and encoded, and the first frame being subjected to the signal processing.

(5) The encoding device according to (4), further including
a second signal processing section configured to perform the signal processing on a pixel in the at least one second frame, the pixel having a low-frequency-component difference of a threshold value or more from the first frame.

(6) The encoding device according to (4) or (5), further including
an in-frame compression signal processing section configured to decompress the at least one second frame being approximately subjected to the signal processing by analyzing a frequency component at least in the separated at least one second frame to extract a pixel being a characteristics point, by performing the signal processing on the pixel, and by generating an interpolation value based on a signal processing result for replacement of a value of a pixel not being the characteristic point.

(7) A decoding device for decoding information transmitted by the encoding device according to any one of (4) to (6), the decoding device including:
a separation section configured to separate the information transmitted by the encoding device into compression codes of the difference data, compression codes of the high-frequency component in the at least one second frame, and the first frame being subjected to the signal processing;
an expansion section configured to expand the compression codes each in the separated difference data and in the separated high-frequency component in the at least one second frame;
a low-frequency component decompression section configured to decompress, using the expanded difference data and the low-frequency component in the first frame being subjected to the signal processing, the low-frequency component in the at least one second frame being approximately subjected to the signal processing; and
a frame decompression section configured to decompress, by an inverse operation of a frequency division, the at least one second frame being approximately subjected to the signal processing, using the decompressed low-frequency component in the at least one second frame and the expanded high-frequency component in the at least one second frame.

The present disclosure contains subject matter related to that disclosed in Japanese Priority Patent Application JP 2011-161791 filed in the Japan Patent Office on Jul. 25, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing method, comprising:
in an image processing apparatus comprising one or more processors:
separating an image taken at a predetermined frame rate into a first frame and at least one second frame other than the first frame at intervals of 1/n, where n is an integer equal to or greater than 2;
calculating a low-frequency-component difference between the at least one second frame and the first frame;
performing signal processing designated by a user on the first frame;
decompressing, using a low-frequency component in the first frame being subjected to the signal processing and the low-frequency-component difference, a low-frequency component in the at least one second frame being subjected to the signal processing; and
decompressing, using the decompressed low-frequency component and a high-frequency component in the at least one second frame, the at least one second frame being subjected to the signal processing.

2. The image processing method according to claim 1, further comprising performing the signal processing on a pixel in the at least one second frame, the pixel having the low-frequency-component difference equal to or above a threshold value from the first frame before the signal processing.

3. The image processing method according to claim 2, further comprising decompressing the at least one second frame being approximately subjected to the signal processing comprising:
analyzing a frequency component in the at least one second frame to extract a pixel being a characteristics point;
performing the signal processing on the pixel; and
generating an interpolation value based on a signal processing result for replacement of a value of a pixel not being the characteristics point.

4. The image processing method according to claim 1, further comprising scanning the image in a horizontal direction or in a vertical direction to determine a pixel as a characteristics point in each pixel group, wherein the pixel group is a region where a difference between a plurality of pixels adjacent to each other in the scanning direction is within a threshold range.

5. An encoding device, comprising:
a frame separation section configured to separate an image taken at a predetermined frame rate into a first frame and at least one second frame other than the first frame at intervals of 1/n, where n is an integer equal to or greater than 2;
a first frequency division section configured to divide each of the first frame and the at least one second frame into a low-frequency component and a high frequency component;
a difference generation section configured to generate difference data in low-frequency component between the at least one second frame and the first frame;

a compression and encoding section configured to compress and encode the difference data and the high-frequency component in the at least one second frame;
a first signal processing section configured to perform signal processing designated by a user on the first frame; and
a transmission section configured to transmit the difference data and the high-frequency component in the at least one second frame both being compressed and encoded, and the first frame being subjected to the signal processing.

6. The encoding device according to claim 5, further comprising a second signal processing section configured to perform the signal processing on a pixel in the at least one second frame, the pixel having a low-frequency-component difference equal to or above a threshold value from the first frame.

7. The encoding device according to claim 6, further comprising an in-frame compression signal processing section configured to decompress the at least one second frame being approximately subjected to the signal processing by: analyzing a frequency component in the at least one second frame to extract a pixel being a characteristics point, performing the signal processing on the pixel, and generating an interpolation value based on a signal processing result for replacement of a value of a pixel not being the characteristics point.

8. A system comprising:
an encoding device comprising:
a frame separation section configured to separate an image taken at a predetermined frame rate into a first frame and at least one second frame other than the first frame at intervals of 1/n, where n is an integer equal to or greater than 2;
a first frequency division section configured to divide each of the first frame and the at least one second frame into a low-frequency component and a high frequency component;
a difference generation section configured to generate difference data in low-frequency component between the at least one second frame and the first frame;
a compression and encoding section configured to compress and encode the difference data and the high-frequency component in the at least one second frame;
a first signal processing section configured to perform signal processing designated by a user on the first frame; and
a transmission section configured to transmit the difference data and the high-frequency component in the at least one second frame both being compressed and encoded, and the first frame being subjected to the signal processings; and
a decoding device comprising:
a separation section configured to separate information transmitted by the encoding device into compression codes of the difference data, compression codes of the high-frequency component in the at least one second frame, and the first frame being subjected to the signal processing;
an expansion section configured to expand the compression codes of the difference data and the high-frequency component in the at least one second frame;
a low-frequency component decompression section configured to decompress, using the difference data and the low-frequency component in the first frame being subjected to the signal processing, the low-frequency component in the at least one second frame being subjected to the signal processing; and
a frame decompression section configured to decompress, by an inverse operation of a frequency division, the at least one second frame being subjected to the signal processing, using the decompressed low-frequency component in the at least one second frame and the high-frequency component in the at least one second frame.

9. The system according to claim 8, wherein the encoding device comprises a second signal processing section configured to perform the signal processing on a pixel in the at least one second frame, the pixel having a low-frequency-component difference equal to or above a threshold value from the first frame.

10. The system according to claim 9, wherein the encoding device comprises an in-frame compression signal processing section configured to decompress the at least one second frame being approximately subjected to the signal processing by: analyzing a frequency component in the at least one second frame to extract a pixel being a characteristics point, performing the signal processing on the pixel, and generating an interpolation value based on a signal processing result for replacement of a value of a pixel not being the characteristics point.

11. An image processing method, comprising:
in an image processing apparatus comprising one or more processors:
separating an image taken at a predetermined frame rate into a first frame and a second frame other than the first frame at intervals of 1/n, where n is an integer equal to or greater than 2;
performing signal processing designated by a user on the first frame;
performing the signal processing on a pixel in the second frame, the pixel detected to have a difference of a threshold value or above based on a pixel-to-pixel comparison between the second frame and the first frame before the signal processing; and
decompressing the second frame being subjected to the signal processing by providing a pixel, not detected to have the difference of the threshold value or above, with a value of a pixel at the same position in the first frame being subjected to the signal processing.

12. An image processing apparatus, comprising:
a frame separation section configured to separate an image taken at a predetermined frame rate into a first frame and a second frame other than the first frame at intervals of 1/n, where n is an integer equal to or greater than 2;
a first signal processing section configured to perform signal processing designated by a user on the first frame;
a comparison section configured to make a pixel-to-pixel comparison between the second frame and the first frame before the signal processing;
a second signal processing section configured to perform the signal processing on a pixel in the second frame, the pixel detected to have a difference of a threshold value or above;
a copy processing section configured to provide a pixel not detected to have the difference of a threshold value or above, with a value of a pixel at the same position in the first frame being subjected to the signal processing; and
a combining section configured to combine an output from the second signal processing section and an output from the copy processing section to decompress the at least one second frame being subjected to the signal processing.

* * * * *